(12) United States Patent
Moutray et al.

(10) Patent No.: US 10,753,474 B2
(45) Date of Patent: Aug. 25, 2020

(54) BLIND BOSS FITTING WITH REDUNDANT SEAL

(71) Applicant: HEXAGON TECHNOLOGY AS, Alesund (NO)

(72) Inventors: Brad James Moutray, Garden City, KS (US); John Allen Eihusen, Lincoln, NE (US); Brian Christopher Yeggy, Lincoln, NE (US)

(73) Assignee: Hexagon Technology AS, Alesund (NO)

( * ) Notice: Subject to any disclaimer, the term of this patent is extended or adjusted under 35 U.S.C. 154(b) by 155 days.

(21) Appl. No.: 16/156,425

(22) Filed: Oct. 10, 2018

(65) Prior Publication Data

US 2019/0136978 A1     May 9, 2019

Related U.S. Application Data

(60) Provisional application No. 62/582,477, filed on Nov. 7, 2017.

(51) Int. Cl.
*F16J 15/10*        (2006.01)
*F17C 13/06*        (2006.01)

(52) U.S. Cl.
CPC .............. *F16J 15/10* (2013.01); *F17C 13/06* (2013.01); *F17C 2205/0305* (2013.01); *F17C 2205/0311* (2013.01)

(58) Field of Classification Search
CPC F16J 15/104; F16J 15/10; F17C 13/06; F17C 13/04; B65D 11/08; B65D 51/18
USPC ..... 220/203.19, 203.01, 202, 581, 582, 601, 220/661; 206/0.6; 277/637, 628; 251/88
See application file for complete search history.

(56) References Cited

U.S. PATENT DOCUMENTS

| | | | | |
|---|---|---|---|---|
| 1,457,584 A | * | 6/1923 | McCuen | F16C 19/183 384/497 |
| 2,577,654 A | * | 12/1951 | Gates | F24D 19/086 251/322 |
| 4,331,175 A | | 5/1982 | Brake et al. | |
| (Continued) | | | | |

FOREIGN PATENT DOCUMENTS

JP     2008002655 A     1/2008

OTHER PUBLICATIONS

International Search Report and Written Opinion in corresponding application PCT/US2018/057920, dated Feb. 15, 2019.

*Primary Examiner* — Robert J Hicks
(74) *Attorney, Agent, or Firm* — Mai-Tram D. Lauer; Westman, Champlin & Koehler, P.A.

(57) ABSTRACT

A boss assembly for a pressure vessel includes a boss, a fitting, a first seal and a second seal. The boss includes a bore with an inner surface and a first stop feature. The fitting is configured for at least partial insertion into the boss to prevent fluid communication between an interior and an exterior of the pressure vessel, the fitting including an outer surface and a second stop feature. Each of the first and second seals is positioned along the outer surface. The fitting is movable between first and second positions. In the first position, the first seal is sealingly engaged between the inner and outer surfaces and the second seal is not sealingly engaged therebetween. In the second position, the first seal is not sealingly engaged between the inner and outer surfaces, the second seal is sealingly engaged, and the first and second stop features mutually contact.

20 Claims, 10 Drawing Sheets

(56) References Cited

U.S. PATENT DOCUMENTS

| | | | |
|---|---|---|---|
| 4,432,559 A | 2/1984 | Rasmussen | |
| 4,899,899 A | 2/1990 | Junier | |
| 6,885,199 B2 | 4/2005 | Desmier et al. | |
| 6,979,002 B2 | 12/2005 | Ramsay | |
| 7,032,767 B2 | 4/2006 | Funck | |
| 7,354,046 B2 | 4/2008 | Ramsay | |
| 7,857,159 B2 | 12/2010 | Lindner | |
| 8,087,529 B2 * | 1/2012 | Koerber | F16J 13/24 220/203.19 |
| 8,523,002 B2 | 9/2013 | Strack et al. | |
| 8,863,973 B2 * | 10/2014 | Kato | B65D 53/00 220/203.06 |
| 8,967,417 B2 * | 3/2015 | Sharp | F17C 1/16 220/581 |
| 2003/0189053 A1 | 10/2003 | Felbaum | |
| 2009/0255940 A1 | 10/2009 | Murate | |

\* cited by examiner

BLIND BOSS FITTING WITH REDUNDANT SEAL

CROSS REFERENCE TO RELATED APPLICATION

This application claims the benefit of priority of U.S. Provisional Patent Application No. 62/582,477, filed Nov. 7, 2017, the content of which is hereby fully incorporated by reference.

BACKGROUND

Pressure vessels are commonly used for containing a variety of fluids under pressure, such as hydrogen, oxygen, natural gas, nitrogen, propane, methane and other fuels, for example. Generally, pressure vessels can be of any size or configuration. The vessels can be heavy or light, single-use (e.g., disposable), reusable, subjected to high pressures (greater than 50 psi, for example), low pressures (less than 50 psi, for example), or used for storing fluids at elevated or cryogenic temperatures, for example.

Suitable pressure vessel shell materials include metals, such as steel; or composites, which may include laminated layers of wound fiberglass filaments or other synthetic filaments bonded together by a thermal-setting or thermoplastic resin. The fiber may be fiberglass, aramid, carbon, graphite, or any other generally known fibrous reinforcing material. The resin material used may be epoxy, polyester, vinyl ester, thermoplastic, or any other suitable resinous material capable of providing fiber-to-fiber bonding, fiber layer-to-layer bonding, and the fragmentation resistance required for the particular application in which the vessel is to be used. The composite construction of the vessels provides numerous advantages such as lightness in weight and resistance to corrosion, fatigue and catastrophic failure. These attributes are due to the high specific strengths of the reinforcing fibers or filaments.

A polymeric or other non-metallic resilient liner or bladder is often disposed within a composite shell to seal the vessel and prevent internal fluids from contacting the composite material. The liner can be manufactured by compression molding, blow molding, injection molding, or any other generally known technique. Alternatively, the liner can be made of other materials, including steel, aluminum, nickel, titanium, platinum, gold, silver, stainless steel, and any alloys thereof. Such materials can be generally characterized as having a high modulus of elasticity. In one embodiment, liner 20 is formed of blow molded high density polyethylene (HDPE).

FIG. 1 illustrates an elongated pressure vessel 10, such as that disclosed in U.S. Pat. No. 5,476,189, entitled "Pressure vessel with damage mitigating system," which is hereby incorporated by reference. Pressure vessel 10 has a main body section 12 and substantially hemispherical or dome-shaped end sections 14. A boss 16, typically constructed of aluminum, is provided at one or both ends of the pressure vessel 10 to provide a port for communication between the interior environment 17 of the pressure vessel 10 and the exterior environment 19. As shown in FIG. 2, pressure vessel 10 is formed with liner 20 (such as an inner polymer liner) covered by a shell 18. In an example, the shell 18 can be a filament-wound composite shell. The shell 18 resolves structural loads on the pressure vessel 10, while liner 20 provides a gas barrier.

FIG. 2 illustrates a partial cross-sectional view, taken along line 2-2 of FIG. 1, of an end section 14 including boss 16, such as that disclosed in U.S. Pat. No. 5,429,845, entitled "Boss for a filament wound pressure vessel," which is hereby incorporated by reference. Boss 16 includes neck 22 having exterior surface 23 and a port 26. The port 26 perpendicularly traverses the exterior surface 23 of the boss 16 and allows fluid communication between the exterior environment 19 and the interior environment 17 of pressure vessel 10. The boss 16 also includes a flange 24 (depicted as an annular flange) extending radially outward from port 26 of neck 22. Generally, flange 24 of boss 16 is contained between portions of liner 20 and/or is sandwiched between the liner 20 and the shell 18. Typically, shell 18 abuts neck 22.

In this disclosure, surfaces, directions, and elements facing interior environment 17 are referred to with the descriptor "interior," and surfaces, directions, and elements facing exterior environment 19 are referred to with the descriptor "exterior." It is to be understood that this notation is not limiting; rather, it is provided for convenience and ease of comprehension, and other descriptors may also be used and/or suitable. Details relevant to the formation of an exemplary pressure vessel are disclosed in U.S. Pat. No. 4,838,971, entitled "Filament Winding Process and Apparatus," which is incorporated herein by reference.

SUMMARY

In one aspect, this disclosure describes a boss assembly for a pressure vessel, the boss assembly including a boss, a fitting, a first seal and a second seal. The boss includes a bore with an inner surface and a first stop feature adjacent the inner surface. The fitting is configured for at least partial insertion into the boss to prevent fluid communication between an interior of the pressure vessel and an exterior of the pressure vessel, the fitting including an outer surface and a second stop features adjacent the outer surface. Each of the first and second seals is positioned along the outer surface. The fitting is movable between first and second positions relative to the boss. In the first position, the first seal is sealingly engaged between the inner and outer surfaces, the second seal is not sealingly engaged between the inner and outer surfaces, and there is no mutual contact between the first and second stop features. In the second position, the first seal is not sealingly engaged between the inner and outer surfaces, the second seal is sealingly engaged between the inner and outer surfaces, and the first stop feature contacts the second stop feature.

In another aspect, a method of using a boss assembly with a pressure vessel is described. The boss assembly includes a boss and a fitting. The boss includes a bore with an inner surface and a first stop feature adjacent the inner surface. The fitting is configured for insertion into the boss to prevent fluid communication between an interior of the pressure vessel and an exterior of the pressure vessel, the fitting including an outer surface and a second stop feature adjacent the outer surface. The method includes inserting the fitting into the bore of the boss to a first position so that a first seal is engaged between the inner and outer surfaces, a second seal is not engaged between the inner and outer surfaces, and there is no mutual contact between the first and second stop features.

This disclosure, in its various combinations, either in apparatus or method form, may also be characterized by the following listing of items:

1. A boss assembly for a pressure vessel, the boss assembly including:

a boss including a bore with an inner surface and a first stop feature adjacent the inner surface;

a fitting configured for at least partial insertion into the boss to prevent fluid communication between an interior of the pressure vessel and an exterior of the pressure vessel, the fitting including an outer surface and a second stop feature adjacent the outer surface;

a first seal positioned along the outer surface; and a second seal positioned along the outer surface;

wherein the fitting is movable between first and second positions relative to the boss, wherein:

in the first position, the first seal is sealingly engaged between the inner and outer surfaces, the second seal is not sealingly engaged between the inner and outer surfaces, and there is no mutual contact between the first and second stop features; and in the second position, the first seal is not sealingly engaged between the inner and outer surfaces, the second seal is sealingly engaged between the inner and outer surfaces, and the first stop feature contacts the second stop feature.

2. The assembly of item 1, wherein the first stop features is a shoulder extending outward from the inner surface and the second stop feature is a face extending outward from the outer surface.

3. The assembly of any of items 1-2, wherein the boss includes an internally threaded surface, and the fitting includes an externally threaded surface configured to engage the internally threaded surface.

4. The assembly of any of items 1-3, wherein the fitting includes a first groove configured to hold the first seal or second seal.

5. The assembly of item 4, wherein the fitting includes a second groove.

6. The assembly of item 5, further including a retainer configured for at least partial insertion into the second groove.

7. The assembly of item 6, wherein the retainer is positioned outside of the boss in the second position.

8. The assembly of item 7, wherein the retainer contacts an exterior surface of the boss in the second position.

9. The assembly of any of items 6-8, wherein the retainer is positioned within the bore in the first position.

10. The assembly of any of items 1-9, wherein the fitting includes a non-circular recess on an exterior surface thereof.

11. A method of using a boss assembly with a pressure vessel, the boss assembly including:

a boss including a bore with an inner surface and a first stop feature adjacent the inner surface; and a fitting configured for insertion into the boss to prevent fluid communication between an interior of the pressure vessel and an exterior of the pressure vessel, the fitting including an outer surface and a second stop feature adjacent the outer surface;

the method including:

inserting the fitting into the bore of the boss to a first position so that a first seal is engaged between the inner and outer surfaces, a second seal is not engaged between the inner and outer surfaces, and there is no mutual contact between the first and second stop features.

12. The method of item 11 further including positioning the first seal into a first groove along the outer surface of the fitting.

13. The method of item 12 further including positioning the second seal into a second groove along the outer surface of the fitting.

14. The method of any of items 12-13 further including positioning a retainer at least partially into a second groove along the outer surface of the fitting.

15. The method of item 14, wherein positioning the retainer includes positioning the retainer outside of the boss.

16. The method of item 15, wherein positioning the retainer includes contacting the retainer to an exterior surface of the boss.

17. The method of any of items 11-16 further including moving the fitting relative to the bore of the boss to a second position so that the first seal is positioned outside of the boss, the second seal is engaged between the inner and outer surfaces, and the first stop feature contacts the second stop feature.

18. The method of item 17, wherein moving the fitting relative to the bore of the boss includes rotating the fitting to engage an internally threaded surface of the boss and an externally threaded surface of the fitting.

19. The method of item 18 including engaging a non-circular recess on an exterior surface of the fitting to rotate the fitting.

20. The method of any of items 17-19, wherein moving the fitting relative to the bore of the boss includes moving a retainer positioned on the fitting within the bore.

This summary is provided to introduce concepts in simplified form that are further described below in the Detailed Description. This summary is not intended to identify key features or essential features of the disclosed or claimed subject matter and is not intended to describe each disclosed embodiment or every implementation of the disclosed or claimed subject matter. Specifically, features disclosed herein with respect to one embodiment may be equally applicable to another. Further, this summary is not intended to be used as an aid in determining the scope of the claimed subject matter. Many other novel advantages, features, and relationships will become apparent as this description proceeds. The figures and the description that follow more particularly exemplify illustrative embodiments.

BRIEF DESCRIPTION OF THE DRAWINGS

The disclosed subject matter will be further explained with reference to the attached figures, wherein like structure or system elements are referred to by like reference numerals throughout the several views. It is contemplated that all descriptions are applicable to like and analogous structures throughout the several embodiments.

While the above-identified figures set forth one or more embodiments of the disclosed subject matter, other embodiments are also contemplated, as noted in the disclosure. In all cases, this disclosure presents the disclosed subject matter by way of representation and not limitation. It should be understood that numerous other modifications and embodiments can be devised by those skilled in the art that fall within the scope of the principles of this disclosure.

The figures may not be drawn to scale. In particular, some features may be enlarged relative to other features for clarity. Moreover, where terms such as above, below, over, under, top, bottom, side, right, left, vertical, horizontal, etc., are used, it is to be understood that they are used only for ease of understanding the description. It is contemplated that structures may be oriented otherwise.

DETAILED DESCRIPTION

Figure 3:
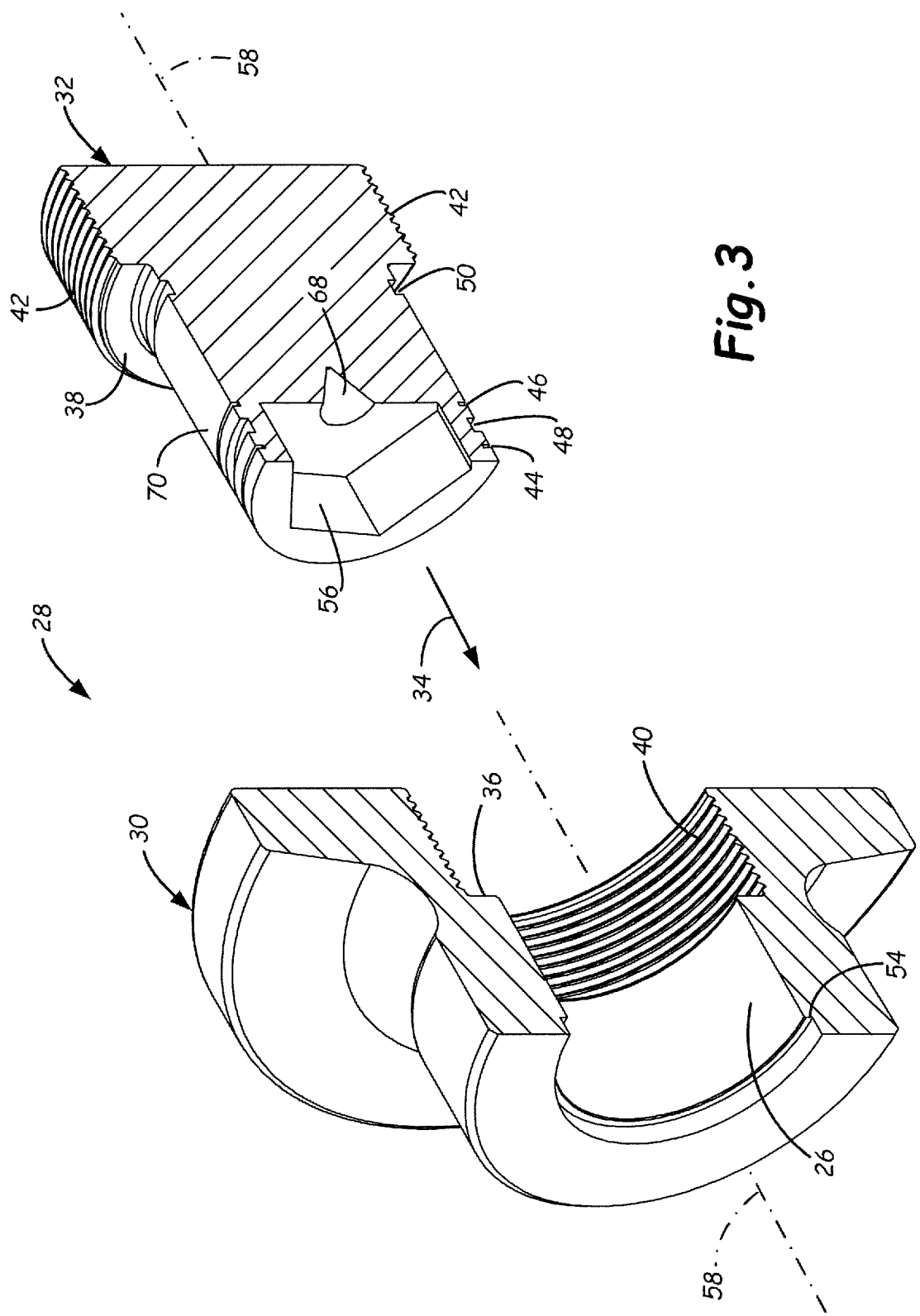
FIG. 3 is an exploded cross-sectional view of components of an exemplary blind boss assembly.
Figure 4:
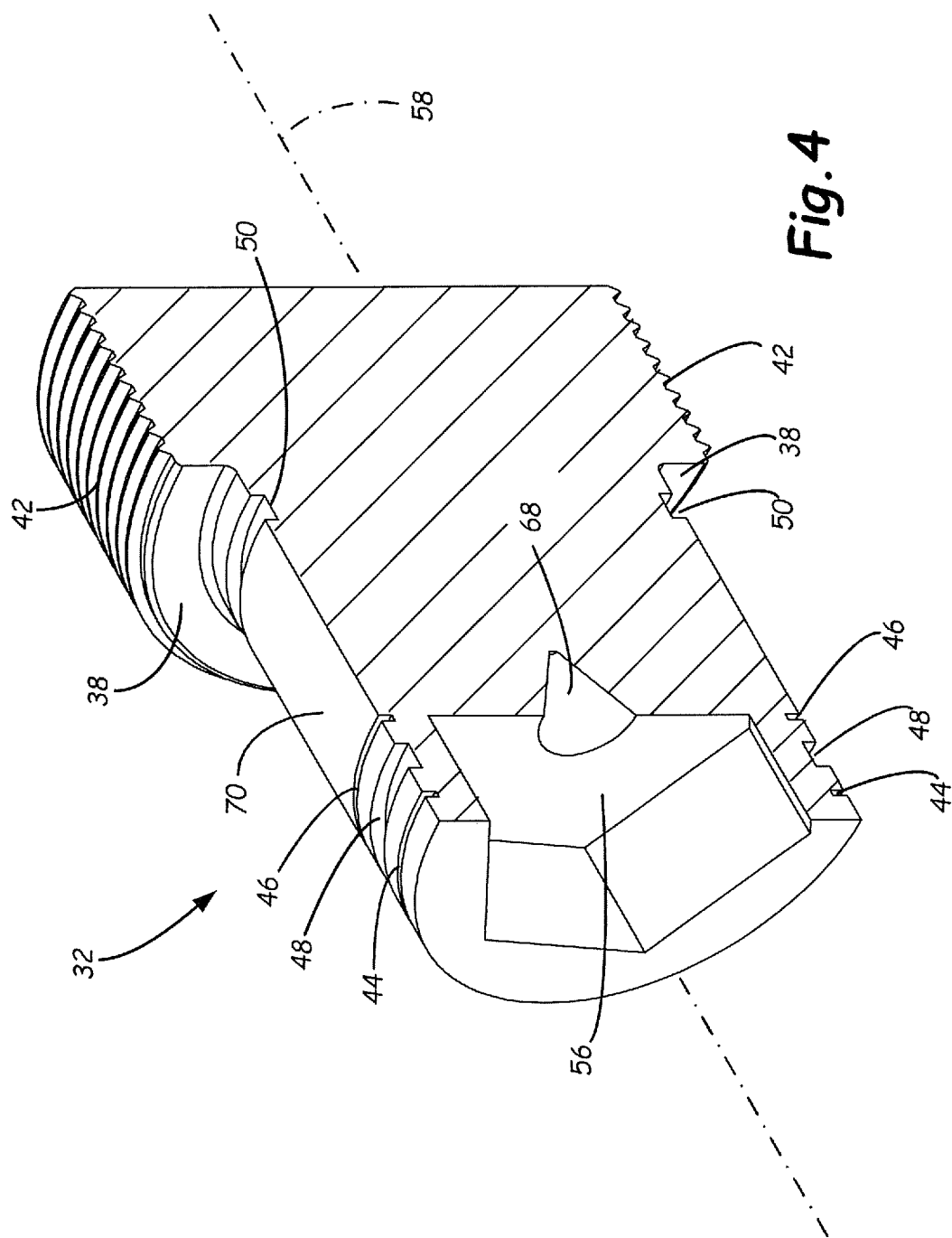
FIG. 4 is an enlarged view of the fitting of FIG. 3.
Figure 5:
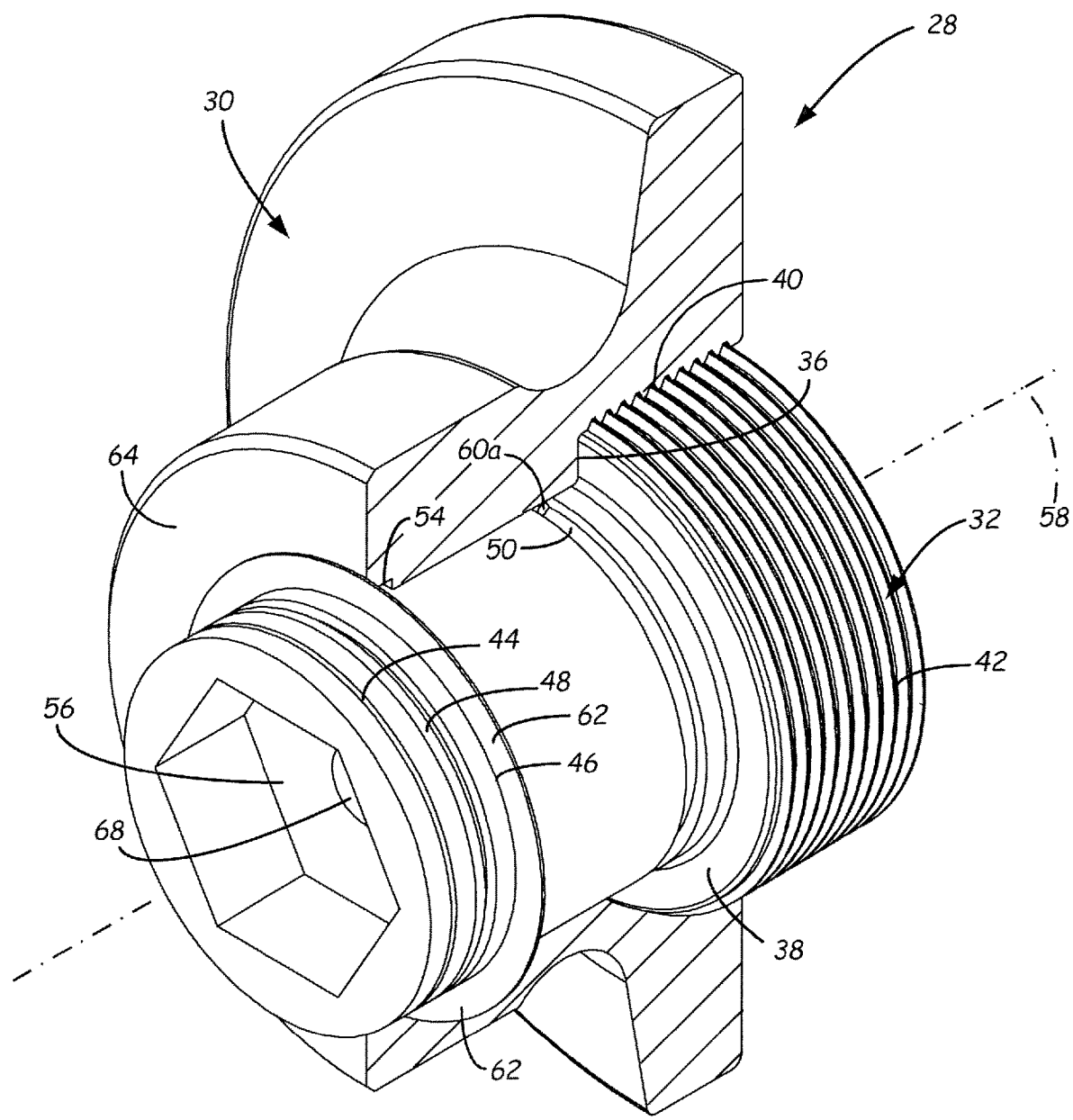
FIG. 5 is a cross-sectional view of the blind boss assembly with the components assembled in a winding mode configuration.
Figure 6:
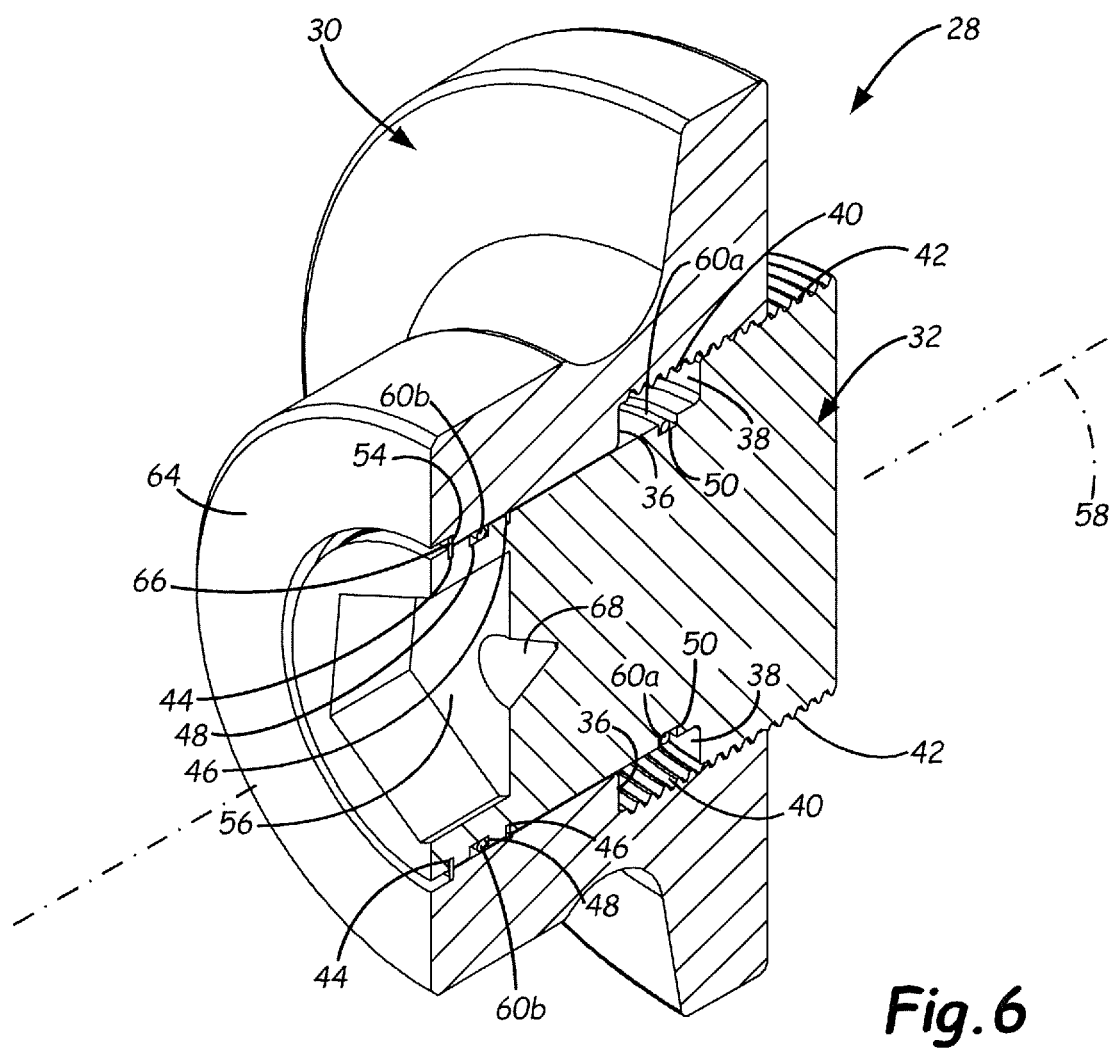
FIG. 6 is similar to FIG. 5 but shows the components assembled in a service mode configuration.
Figure 7:
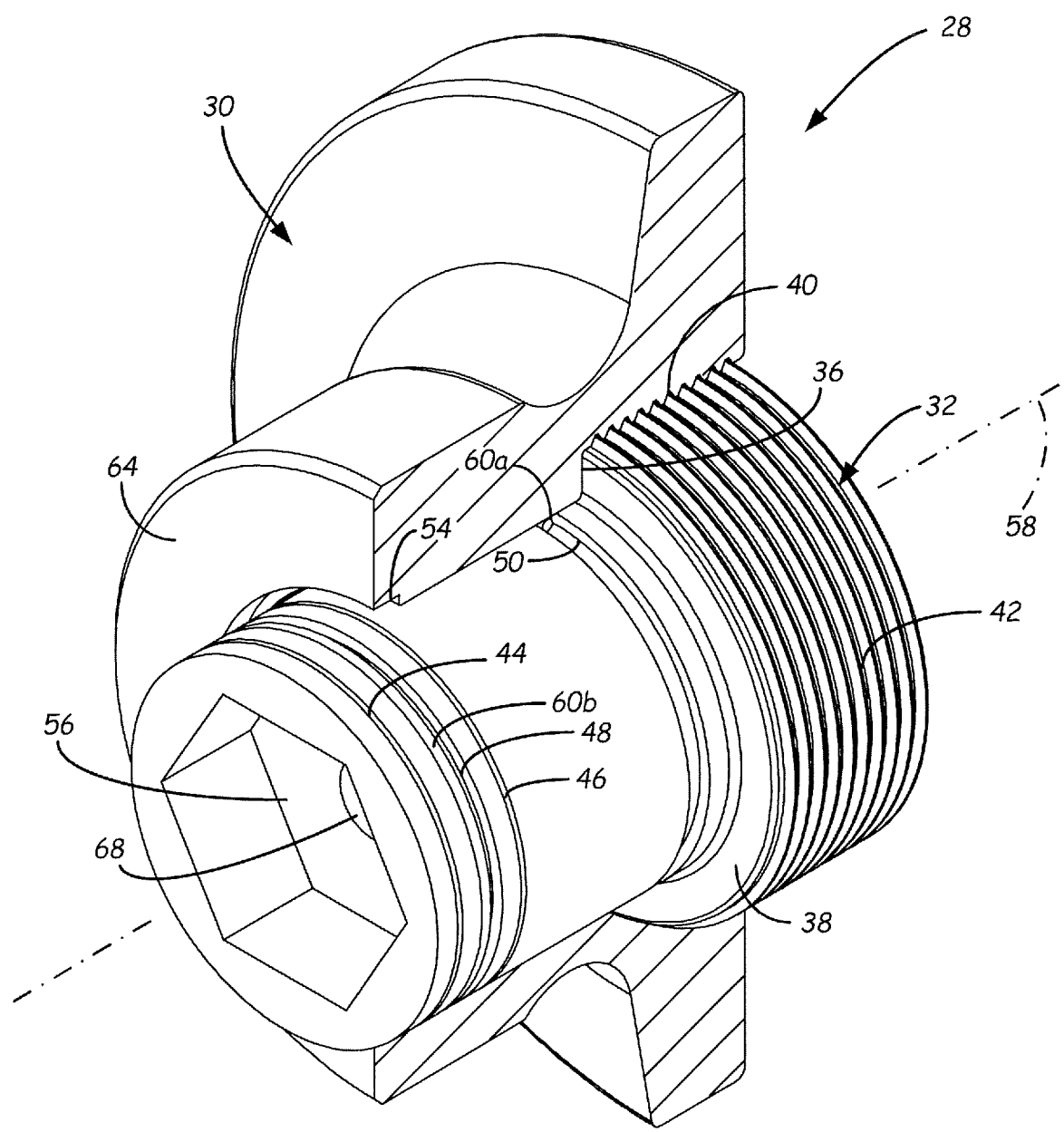
FIG. 7 is similar to FIGS. 5 and 6 but shows the components assembled in a maintenance mode configuration.

This disclosure relates to a blind boss assembly 28 that is formed as a two-piece structure including a boss 30 and a fitting 32 configured for insertion into a port 26 of the boss 30, as shown in FIGS. 3-7. FIG. 4 is an enlarged cross-sectional view of the fitting 32 configured to be threaded into the boss 30. As shown in FIG. 5, the connected configuration of the boss 30 and fitting 32 is maintained by a retaining ring 62 that prevents mutual detachment of the parts during a filament winding process to form a pressure vessel 10. After pressure vessel formation is complete, the pressure vessel 10 is put in service, with the blind boss assembly 28 configured as shown in FIG. 6. FIG. 7 illustrates a maintenance mode configuration of the assembly 28.

Figure 1:
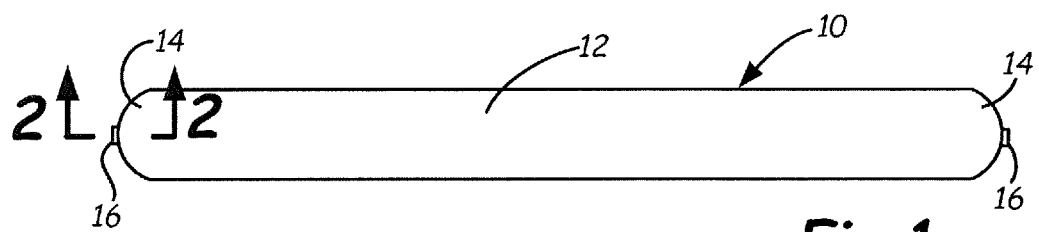
FIG. 1 is a side view of a typical conventional pressure vessel.
Figure 2:
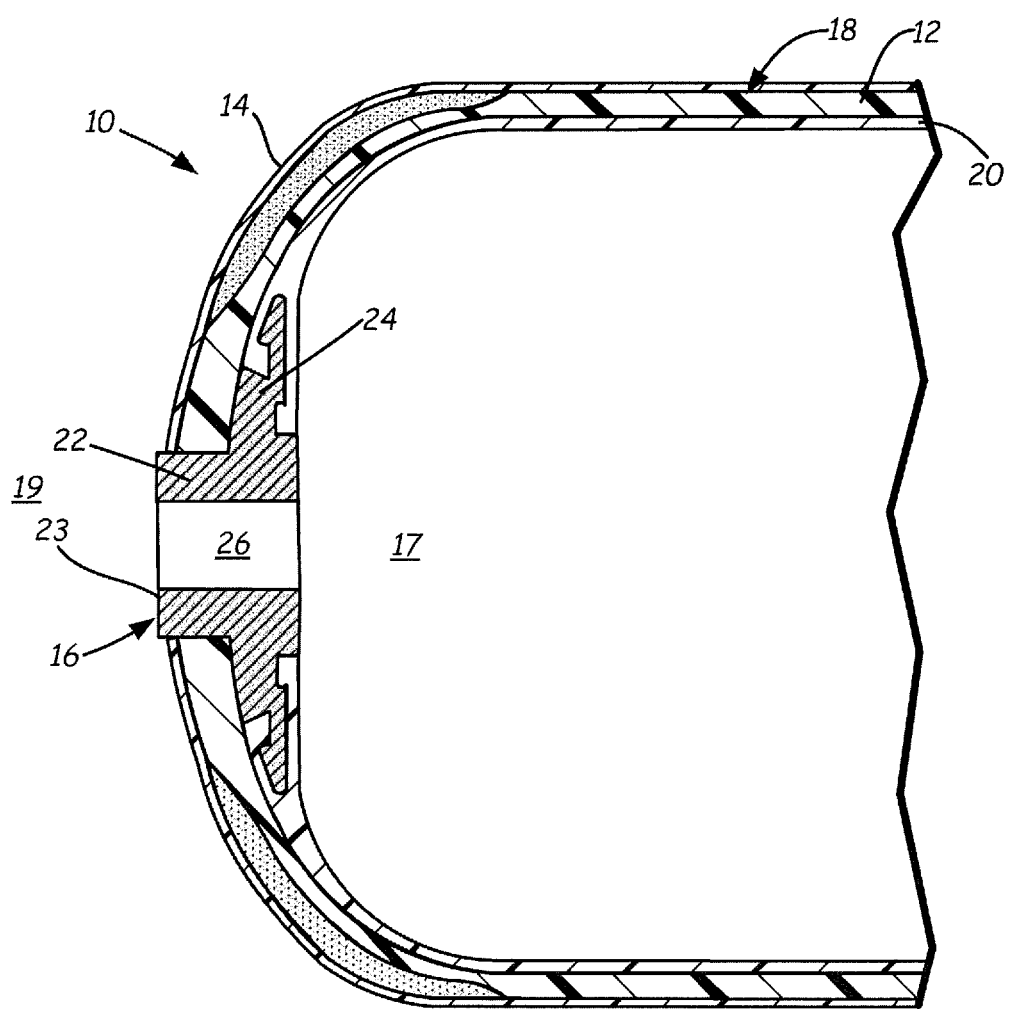
FIG. 2 is a partial cross-sectional view of one end of the pressure vessel of FIG. 1, taken along line 2-2 of FIG. 1.

FIG. 3 is a radial cross-sectional view of exemplary components of a blind boss assembly 28, including boss 30 and fitting 32. While only half of each component is illustrated, it is to be understood that in an exemplary embodiment, the components are symmetrical about the cut line of the cross-section and annular about the longitudinal axis 58. Blind boss assembly 28 may be used in the place of boss 16 of pressure vessel 10 to close an opening in the pressure vessel. While a particular configuration of the components of blind boss assembly 28 are illustrated, it is to be understood that other boss features may be incorporated, including dovetail joints of flange 24 shown with respect to boss 16 of FIG. 2, for example. FIG. 4 is an enlarged view of the fitting 32 of FIG. 3, which allows for a more clear view of the structural features of fitting 32.

As shown in FIG. 3, boss 30 and fitting 32 are configured so that fitting 32 can be inserted in insertion direction 34 to a variable depth within boss 30, but limited by the abutment of shoulder 36 of boss 30 and face 38 of fitting 32. In an exemplary embodiment, boss 30 includes an interiorly threaded surface 40, configured to cooperate with exteriorly threaded surface 42 of fitting 32. Fitting 32 includes two retainer grooves 44 and 46 and two sealing grooves 48 and 50. Fitting 32 includes recess 56, which is keyed for non-rotatable engagement with a tool, thereby allowing a user to turn fitting 32 about a common longitudinal axis 58 with boss 30, for threadably inserting and engaging fitting 32 within the port 26 of boss 30. In an exemplary embodiment, recess 56 includes a central winding feature 68 in the form of a conical recess. Central winding feature 68 allows a mandrel element to hold boss assembly 28 in a centered manner that allows rotation about axis 58.

FIG. 5 shows boss 30 and fitting 32 assembled in a winding mode configuration of boss assembly 28, with fitting 32 shown in perspective and boss 30 shown in radial cross-section. This configuration is useful for maintaining the assembled state of boss 30 and fitting 32 when assembly 28 is inserted into an opening of a liner 20 of a pressure vessel 10, and is held therein while shell 18 is being filament wound upon the liner 20. An o-ring, gasket or other seal 60a (shown in cross-section) is inserted into sealing groove 50 to seal against fluid egress or ingress at the interface of boss 30 and fitting 32. A winding retainer 62, such as a retaining ring, is inserted into retainer groove 46 and held against exterior face 64 of boss 30. Retainer 62 thus holds boss 30 and fitting 32 in the fully inserted configuration in which shoulder 36 of boss 30 is in contact with face 38 of fitting 32, thereby preventing their mutual disengagement along axis 58.

Figure 10:
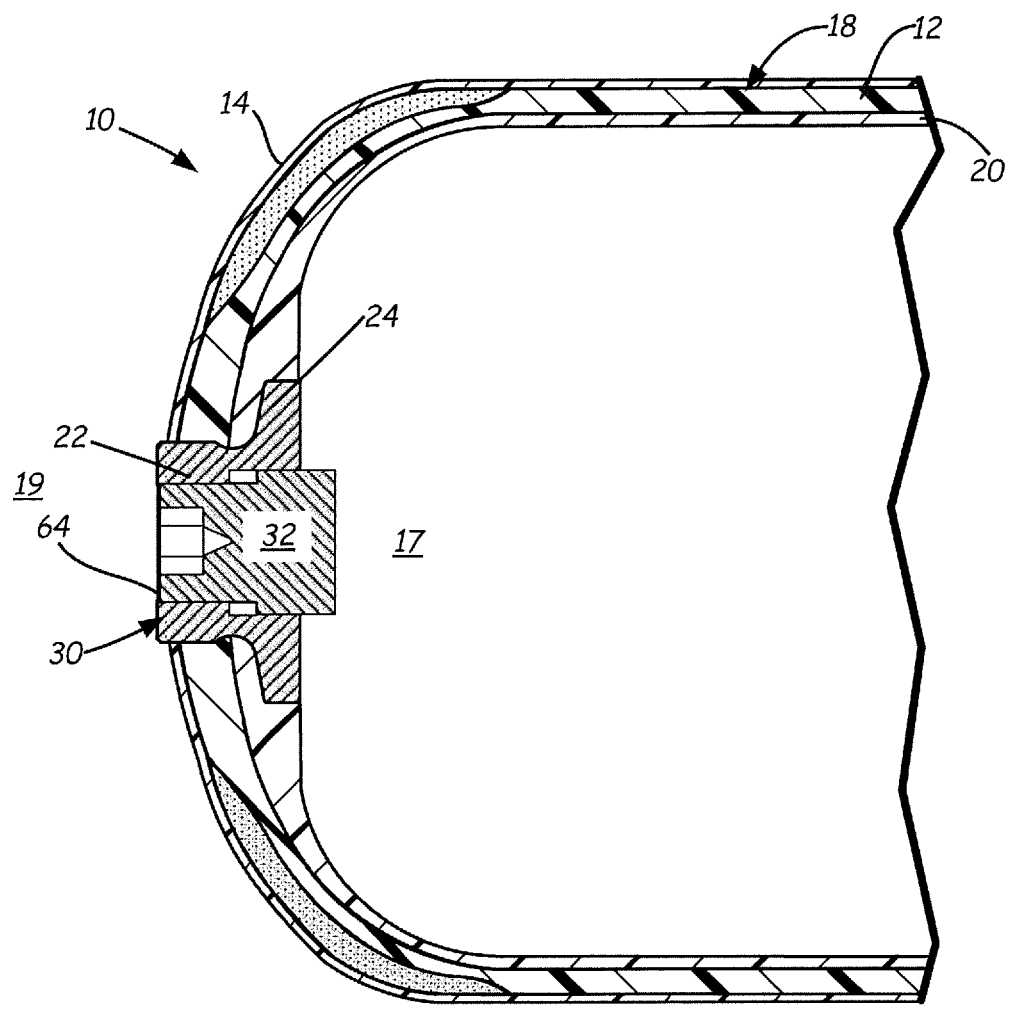
FIG. 10 is a partial cross-sectional view of one end of a pressure vessel including an exemplary blind boss assembly with the components assembled in the service mode configuration of FIG. 6.

FIG. 6 is a radial cross-sectional view of the blind boss assembly 28 in a service mode configuration, wherein the blind boss assembly 28 is provided on a pressure vessel 10 that is pressurized by fluid in interior environment 17 (see also FIG. 10). In this configuration, winding retainer 62 has been removed, and a service retainer 66 is placed in retainer groove 44 of fitting 32. Service retainer 66 has a maximum displacement to the right of FIG. 6 that is limited by shoulder 54 of boss 30. Service retainer 66 may be similar to winding retainer 62 in that both are substantially flat, annular or C-shaped retaining rings in exemplary embodiments. However, service retainer 66 has a smaller outer radial dimension than winding retainer 62, allowing it to fit beyond exterior face 64 of boss 30 and within port 26 until it abuts shoulder 54.

In this configuration, an additional seal 60b, such as on o-ring, is placed in sealing groove 48. Accordingly, this seal 60b closes the interface between boss 30 and fitting 32 to prevent fluid egress or ingress at the interface between these components. While seal 60a remains in sealing groove 50, in this configuration, that seal 60a does not perform a sealing function, as surfaces of boss 30 and fitting 32 do not contact proximate the sealing groove 50 in this service configuration.

While retainer 66 is fixed in position relative to fitting 32 at retainer groove 44, the retainer 66 is permitted to move along longitudinal axis 58, along with fitting 32, in the left direction depicted in FIG. 6 until shoulder 36 of boss 30 contacts face 38 of fitting 32. Displacement of fitting 32 with respect to boss 30 to the right in FIG. 6 is limited by contact of retainer 66 with shoulder 54 of boss 30. Accordingly, in this service mode configuration, blind boss assembly 28 allows for limited expansion and contraction, as reflected in the movement of fitting 32 in the orientation of longitudinal axis 58 into and out of boss 30, while still providing a fluid-tight seal at seal 60b located in sealing groove 48 and/or seal 60a located in sealing groove 50.

In time, seal 60b in sealing groove 48 may require replacement due to a break-down in materials and/or structure because of the passage of age and/or wear due to pressure cycling of the pressure vessel. FIG. 7 shows blind boss assembly 28 in a maintenance mode configuration, with fitting 32 shown in perspective and boss 30 shown in radial cross-section, wherein boss 30 and fitting 32 are in relative positions like the position shown in FIG. 5. However, retainer 62 of FIG. 5 is omitted (and service retainer 66 is likewise omitted in this view). Seal 60b in sealing groove 48 is exposed so that a user can remove and replace that seal 60b. At the same time, seal 60a in sealing groove 50 remains in service to seal an interface between boss 30 and fitting 32, to prevent fluid egress and ingress from pressure vessel 10, even when the seal 60b in sealing groove 48 is removed or not in service.

A displacement of fitting 32 relative to boss 30 in the direction to the left in FIG. 7 is limited by the mutual contact of shoulder 36 of boss 30 and face 38 of fitting 32. Excessive displacement of fitting 32 relative to boss 30 in a direction to the right of FIG. 7 is inhibited by the pressure of fluid contained within the pressure vessel 10. Additionally, displacement of fitting 32 relative to boss 30 in the direction to the right in FIG. 7 can be limited by the mutual contact of shoulder 54 of boss 30 and retainer 66, which may be held in groove 44 of fitting 32, as shown in FIG. 6.

At least one of the seals 60a, 60b is in service to seal an interface of boss 30 and fitting 32 in all of the winding, service and maintenance configurations shown in FIGS. 5-7. Thus, pressure vessel 10 remains sealed during all these stages, thereby not posing a risk of high-pressure fluid evacuation from the pressure vessel at any time.

Seal 60a in the sealing groove 50 will generally require less maintenance or replacement than seal 60b in sealing groove 48. This is expected because seal 60a in sealing groove 50 is typically in service essentially only during the winding and maintenance configurations of FIGS. 5 and 7, which will occur infrequently during the useful life of the pressure vessel. However, in case it is desirable to replace seal 60a in sealing groove 50, the pressure vessel can be depressurized, such by evacuating the pressure vessel through a different port than that closed by blind boss assembly 28. Fitting 32 can be then completely removed from boss 30, such as shown in FIG. 3, and tools can be used to hold and manipulate fitting 32 within pressure vessel 10 to remove seal 60a from sealing groove 50 and replace it as needed. In a case where a pressure vessel includes another port that is larger than fitting 32, such a larger port may allow access to an interior 17 of the pressure vessel 10 for maintenance and manipulation of fitting 32 independently of boss 30.

It is contemplated that boss 30 and fitting 32 will be formed of strong metallic material such as aluminum, for example. In some cases, boss 30 and fitting 32 may be made of different materials selected to resolve structural loads expected during use of the pressure vessel 10. Typically, seals 60a, 60b will be formed of a softer durometer polymer with some resilience, allowing each seal 60b, 60a to stretch over outer surface 70 of fitting 32 and snap into its respective sealing groove 48, 50. Winding retainer 62 and service retainer 66 can be formed of a more rigid polymer material that similarly possesses resilience, in order to flex adequately over outer surface 70 and snap into retainer grooves 46 and 44, respectively. As shown in FIG. 3, fitting 32 is configured to be inserted in direction 34 (such as from an interior 17 of a pressure vessel 10). Accordingly, in most applications, insert 32 will have been positioned into boss 30 before complete formation of a pressure vessel. For example, blind boss assembly 28 can be positioned at a port of a vessel liner 20 before the vessel shell 18 is wound thereon.

As shown in FIGS. 5 and 6, the installation of either or both of winding retainer 62 or service retainer 66 in one of the retainer grooves 44, 46 prevents fitting 32 from completely disengaging from boss 30 inadvertently. As shown in FIG. 5, movement of fitting 32 to the right is limited by the contact of winding retainer 62 against exterior surface 64 of boss 30. As shown in FIG. 6, when using service retainer 66, displacement of fitting 32 relative to boss 30 to the right is limited by contact of service retainer 66 with shoulder 54 of boss 30.

As shown in FIG. 6, after initial installation of seals 60b, 60a within sealing grooves 48 and 50, respectively, the seals 60b, 60a are protected from exposure to both the interior environment 17 and the exterior environment 19 of pressure vessel 10. Accordingly, seals 60a, 60b are shielded from environmental deterioration.

In the "service mode" shown in FIG. 6 (referred to below as the "first position"), fitting 32 is partially unthreaded relative to boss 30, compared to the "winding mode" configuration of FIG. 5, so that a primary seal in the form of seal 60b in sealing groove 48 is engaged between boss 30 and fitting 32. To allow seal 60b to be easily maintained and/or replaced, the "maintenance mode" of FIG. 7 (referred to below as the "second position") shows boss 30 and fitting 32 in a configuration wherein a secondary seal 60a in sealing groove 50 is engaged to prevent leakage between boss 30 and fitting 32 while the primary seal 60b in sealing groove 48 can be removed for replacement. Because of these redundant seals 60a, 60b, blind boss assembly 28 is always sealed, even if maintenance is performed while pressure vessel 10 remains under pressure.

Figure 8:
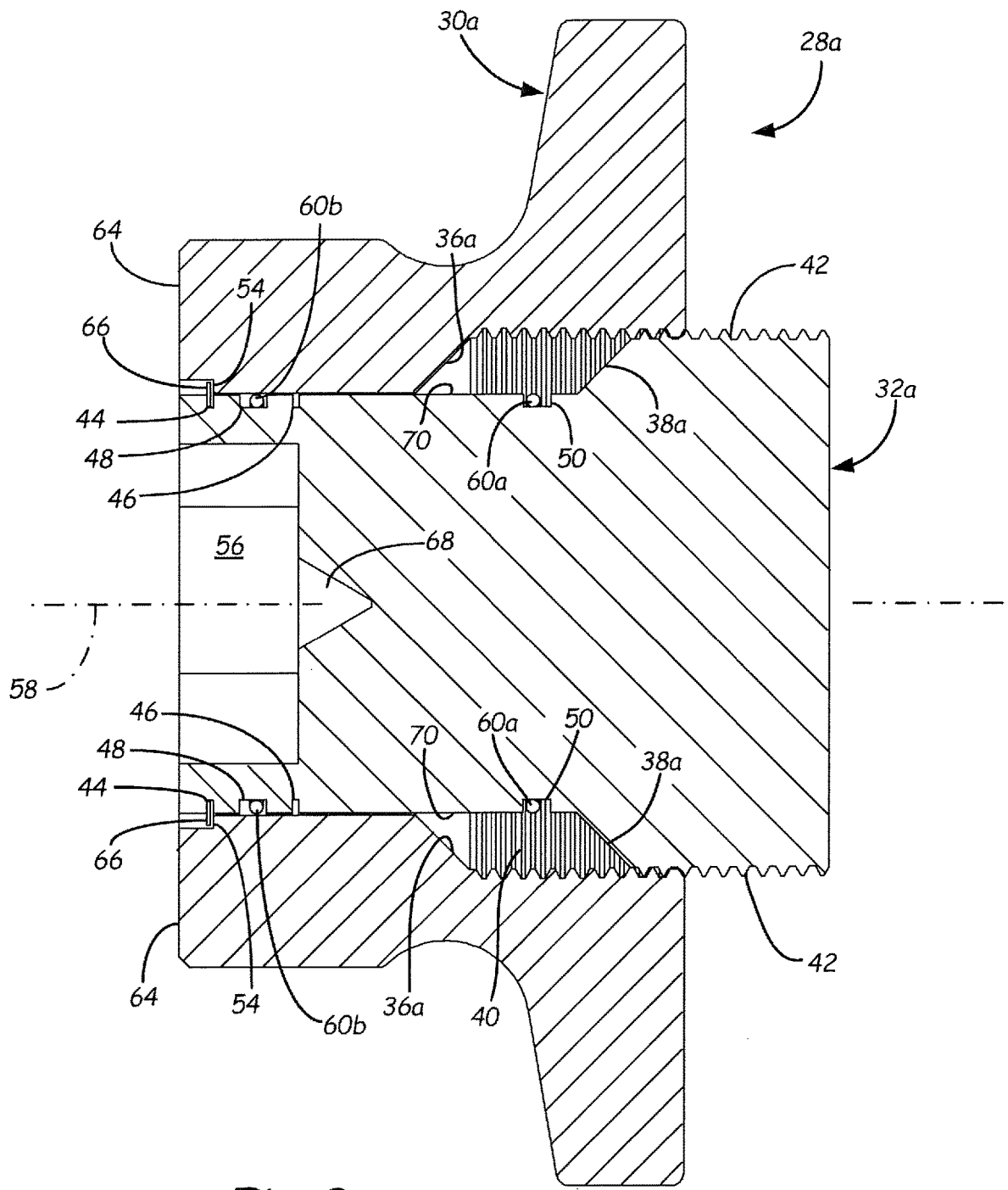
FIG. 8 is a radial cross-sectional view of a second exemplary embodiment of a blind boss assembly in a service mode configuration.
Figure 9:
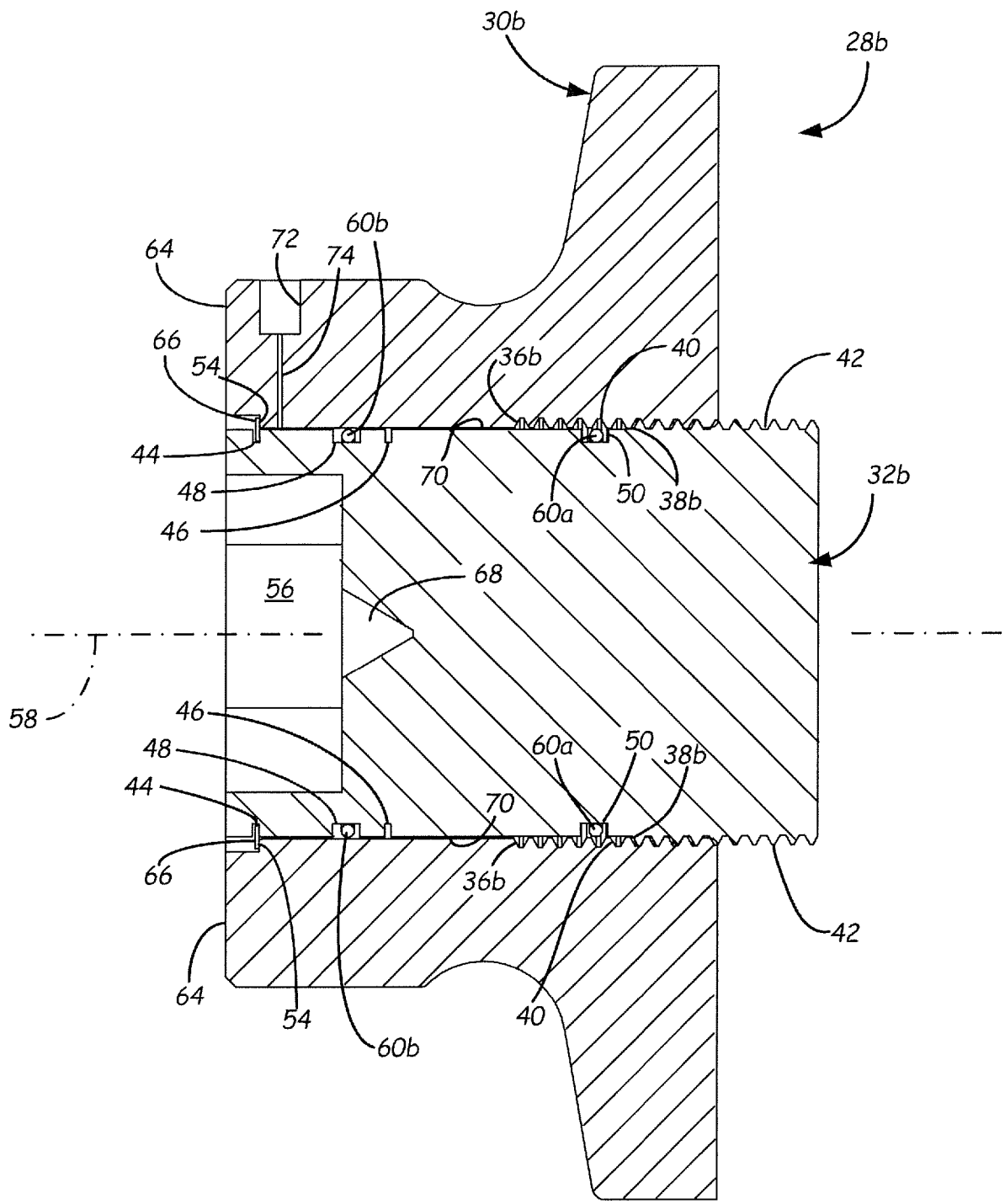
FIG. 9 is a radial cross-sectional view of a third exemplary embodiment of a blind boss assembly in a service mode configuration.

FIG. 8 is a radial cross-sectional view of a second exemplary embodiment of a blind boss assembly 28a in a service mode configuration. FIG. 9 is a radial cross-sectional view of a third exemplary embodiment of a blind boss assembly 28b in a service mode configuration. Many of the components and features of the blind boss assemblies 28a and 28b are analogous to those discussed above with reference to the embodiment of blind boss assembly 28. Accordingly, it is to be understood that descriptions of components and features of one embodiment also apply to analogous elements of other embodiments, unless described otherwise.

FIGS. 6, 8 and 9 illustrate three embodiments of features that prevent fitting 32, 32a, 32b from being inserted too far in insertion direction 34 (labeled in FIG. 3) with respect to boss 30, 30a, 30b. In assembly 28 of FIG. 6, boss 30 includes a first stop feature in the form of shoulder 36, which extends radially outward from, and is adjacent to, the inner surface of port 26. Fitting 32 includes a second stop feature in the form of face 38, which extends radially outward from, and is adjacent to, outer surface 70 of fitting 32 (labeled in FIG. 3). Mutual contact between shoulder 36 and face 38, as shown in FIGS. 5 and 7, limits the extent by which fitting 32 can be inserted into boss 30 in insertion direction 34.

In assembly 28a of FIG. 8, boss 30a includes a first stop feature in the form of shoulder 36a, which extends at an angle outward from, and is adjacent to, the inner surface of port 26. Fitting 32a includes a second stop feature in the form of face 38a, which extends at an angle outwardly from, and is adjacent to, outer surface 70 of fitting 32a. In the illustrated embodiment, shoulder 36a and face 38a are similarly inclined or tapered so that their surfaces are substantially parallel. Mutual contact between shoulder 36a and face 38a limits the extent by which fitting 32a can be inserted into boss 30a in insertion direction 34 (labeled in FIG. 3).

In assembly 28b of FIG. 9, boss 30b includes a first stop feature in the form of end thread 36b, which is adjacent to the inner surface of port 26. Fitting 32b includes a second stop feature in the form of end thread 38b, which is adjacent to outer surface 70 of fitting 32b. Mutual contact between end thread 36b and end thread 38b limits the extent by which fitting 32b can be inserted into boss 30b in insertion direction 34 (labeled in FIG. 3).

Figure 9A:
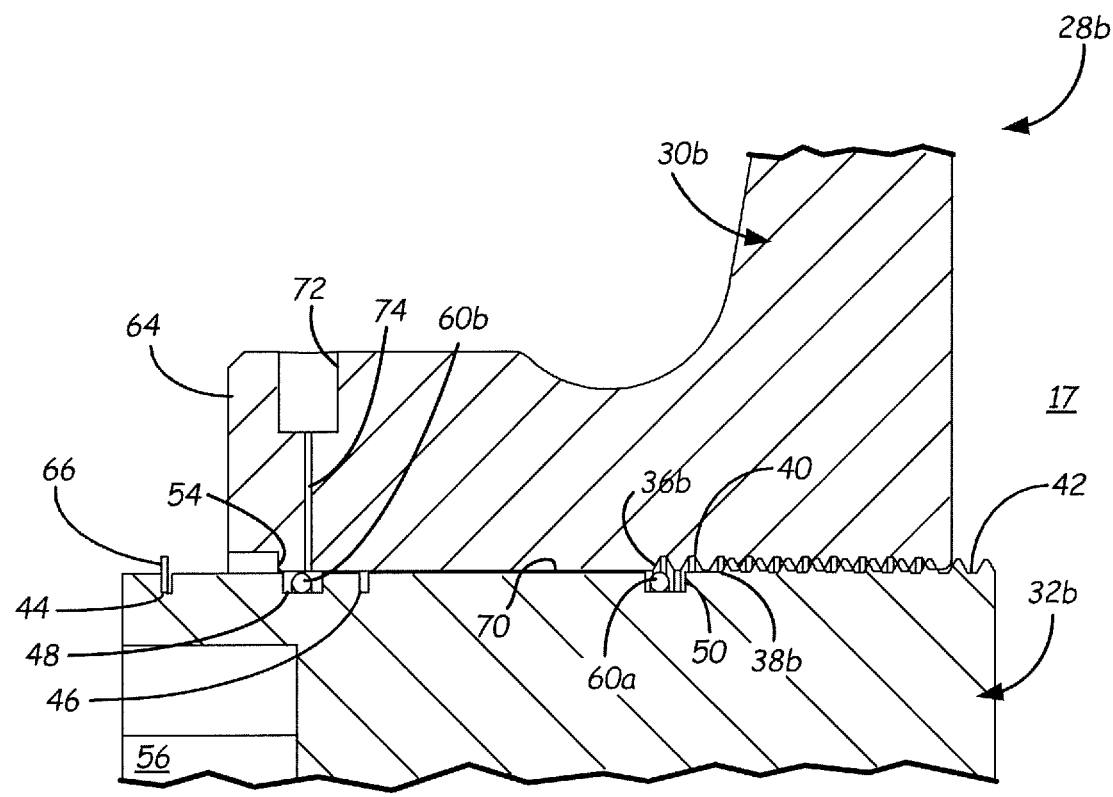
FIG. 9A is a partial view of the blind boss assembly of FIG. 9 in a venting configuration.

In FIG. 9, the components of blind boss assembly 28b are assembled in a sealed, service mode configuration. In contrast, FIG. 9A shows a venting configuration of the blind boss assembly 28b, wherein fitting 32b is unthreaded from boss 30b to an extent that a fluid communication path is established between groove 48 and vent port 72, via channel 74. In an exemplary embodiment, in a venting configuration, a fluid communication vent path is also established between groove 50 and interior environment 17 of a pressure vessel through an undulating fluid communication path between the interiorly threaded surface 40 of boss 30b and the exteriorly threaded surface 42 of fitting 32b. In this manner, any accumulated gas in grooves 48 and 50 can be vented. Moreover, in an exemplary embodiment, port 72 may be connected to a reservoir or other container for reclaiming the vented gas. The disclosed vent paths also offer a means by which a pressure vessel 10, in which the blind boss assembly 28b is installed, can be slowly de-pressurized in a controlled manner. Where vent port 72 is connected to a reservoir, the vented contents of the pressure vessel 10 can be captured therein.

Exemplary, non-limiting descriptions of suitable embodiments follow: An exemplary boss assembly 28, 28a, 28b for pressure vessel 10 includes boss 30, 30a, 30b, fitting 32, 32a, 32b and first and second seals 60a, 60b. Boss 30, 30a, 30b includes bore 26 with an inner surface and a first stop feature 36, 36a, 36b adjacent the inner surface. Fitting 32, 32a, 32b is configured for insertion at least partially into boss 30, 30a, 30b to prevent fluid communication between an interior 17 of pressure vessel 10 and an exterior 19 of pressure vessel 10. Fitting 32, 32a, 32b includes an outer surface 70 and a second stop feature 38, 38a, 38b adjacent the outer surface 70. Outer seal 60b is positioned along outer surface 70, such as at sealing groove 48. Inner seal 60a is positioned along outer surface 70, such as at sealing groove 50. Fitting 32, 32a, 32b is movable between first and second positions relative to boss 30, 30a, 30b. In the first position illustrated in FIGS. 6, 8 and 9, outer seal 60b (at sealing groove 48) is sealingly engaged between the inner and outer surfaces, inner seal 60a (at sealing groove 50) is not sealingly engaged between the inner and outer surfaces, and there is no mutual contact between first stop feature 36, 36a, 36b and second stop feature 38, 38a, 38b. In the second position (shown in FIGS. 5 and 7 for one embodiment), the outer seal 60b is not sealingly engaged between the inner and outer surfaces, inner seal 60a (at sealing groove 50) (at sealing groove 48) is sealingly engaged between the inner and outer surfaces, and first stop feature 36, 36a, 36b contacts second stop feature 38, 38a, 38b. In an exemplary embodiment, in the second position, outer seal 60b (at sealing groove 48) is positioned outside of boss 30, 30a, 30b.

In an exemplary embodiment, at least one of the inner surface of bore 26 and the outer surface 70 is substantially cylindrical. In an exemplary embodiment, boss 30, 30a, 30b includes internally threaded surface 40, and fitting 32, 32a, 32b includes externally threaded surface 42 configured to engage internally threaded surface 40. In an exemplary embodiment, fitting 32, 32a, 32b includes a non-circular recess 56 on an exterior surface thereof.

In an exemplary embodiment, fitting 32, 32a, 32b includes a groove 48 or 50 configured to hold the outer seal 60b or inner seal 60a. In an exemplary embodiment, fitting 32, 32a, 32b includes another groove 44 or 46. As shown in FIG. 5, retainer 62 is configured for at least partial insertion into the groove 46. Retainer 62 is positioned outside of the boss 30, 30a, 30b in the second position of assembly 28, 28a, 28b, such as illustrated in FIG. 5. Retainer 62 contacts an exterior surface 64 of the boss 30, 30a, 30b in the second position of assembly 28, 28a, 28b. As shown in FIGS. 6-9, retainer 66 is configured for at least partial insertion into groove 44. As shown in FIGS. 6, 8 and 9, retainer 66 is positioned within the bore 26 of boss 30, 30a, 30b in the first position of assembly 28, 28a, 28b. Retainer 66 can be positioned in groove 44 and outside of the boss 30, 30a, 30b in the second position of assembly 28, 28a, 28b.

The disclosure is also directed to a method of using a boss assembly 28, 28a, 28b with a pressure vessel 20. The method includes inserting fitting 32, 32a, 32b into bore 26 of boss 30, 30a, 30b to a first position, shown in FIGS. 6, 8 and 9, so that outer seal 60b (at sealing groove 48) is engaged between the inner and outer surfaces, inner seal 60a (at sealing groove 50) is not engaged between the inner and outer surfaces, and there is no mutual contact between first stop feature 36, 36a, 36b and second stop feature 38, 38a, 38b. An exemplary method further includes positioning outer seal 60b into groove 48 along outer surface 70 of fitting 32, 32a, 32b. An exemplary method further includes positioning inner seal 60a into groove 50 along outer surface 70 of fitting 32, 32a, 32b. An exemplary method further includes positioning retainer 62, 66 at least partially into groove 44, 46 along outer surface 70 of fitting 32, 32a, 32b. In an exemplary method, positioning retainer 62, 66 includes positioning retainer 62, 66 outside of boss 30, 30a, 30b. As shown in FIG. 5, positioning retainer 62 includes contacting retainer 62 to exterior surface 64 of boss 30, 30a, 30b.

An exemplary method further includes moving fitting 32, 32a, 32b relative to bore 26 of boss 30, 30a, 30b from a first position (such as shown in FIG. 6) to a second position (such as shown in FIG. 7) so that the outer seal 60b (at sealing groove 48) is positioned outside of the boss 30, 30a, 30b, the inner seal 60a (at sealing groove 50) is engaged between the inner and outer surfaces, and first stop feature 36, 36a, 36b contacts second stop feature 38, 38a, 38b. In an exemplary method, moving fitting 32, 32a, 32b relative to bore 26 of boss 30, 30a, 30b includes rotating fitting 32, 32a, 32b about longitudinal axis 58 to engage internally threaded surface 40 of boss 30, 30a, 30b and externally threaded surface 42 of fitting 32, 32a, 32b. In an exemplary method, such rotation includes engaging a tool with non-circular recess 56 on an exterior surface of fitting 32, 32a, 32b. In an exemplary method, moving fitting 32, 32a, 32b relative to bore 26 of boss 30, 30a, 30b includes moving retainer 66 positioned on fitting 32, 32a, 32b within bore 26 and out of bore 26.

Although the subject of this disclosure has been described with reference to several embodiments, workers skilled in the art will recognize that changes may be made in form and detail without departing from the scope of the disclosure. In addition, any feature disclosed with respect to one embodiment may be incorporated in another embodiment, and vice-versa.

The invention claimed is:
1. A boss assembly for a pressure vessel, the boss assembly including:
 a boss including a bore with an inner surface and a first stop feature adjacent the inner surface;
 a fitting configured for at least partial insertion into the boss to prevent fluid communication between an interior of the pressure vessel and an exterior of the pressure vessel, the fitting including an outer surface and a second stop feature adjacent the outer surface;
 a first seal positioned along the outer surface; and
 a second seal positioned along the outer surface;

wherein the fitting is movable between first and second positions relative to the boss, wherein:

in the first position, the first seal is sealingly engaged between the inner and outer surfaces, the second seal is not sealingly engaged between the inner and outer surfaces, and there is no mutual contact between the first and second stop features; and in the second position, the first seal is not sealingly engaged between the inner and outer surfaces, the second seal is sealingly engaged between the inner and outer surfaces, and the first stop feature contacts the second stop feature.

2. The assembly of claim 1, wherein the first stop feature is a shoulder extending outward from the inner surface and the second stop feature is a face extending outward from the outer surface.

3. The assembly of claim 1, wherein the boss includes an internally threaded surface, and the fitting includes an externally threaded surface configured to engage the internally threaded surface.

4. The assembly of claim 1, wherein the fitting includes a first groove configured to hold the first seal or second seal.

5. The assembly of claim 4, wherein the fitting includes a second groove.

6. The assembly of claim 5, further including a retainer configured for at least partial insertion into the second groove.

7. The assembly of claim 6, wherein the retainer is positioned outside of the boss in the second position.

8. The assembly of claim 7, wherein the retainer contacts an exterior surface of the boss in the second position.

9. The assembly of claim 6, wherein the retainer is positioned within the bore in the first position.

10. The assembly of claim 1, wherein the fitting includes a non-circular recess on an exterior surface thereof.

11. A method of using a boss assembly with a pressure vessel, the boss assembly including:

a boss including a bore with an inner surface and a first stop feature adjacent the inner surface; and a fitting configured for insertion into the boss to prevent fluid communication between an interior of the pressure vessel and an exterior of the pressure vessel, the fitting including an outer surface and a second stop feature adjacent the outer surface;

the method including:

inserting the fitting into the bore of the boss to a first position so that a first seal is engaged between the inner and outer surfaces, a second seal is not engaged between the inner and outer surfaces, and there is no mutual contact between the first and second stop features.

12. The method of claim 11 further including positioning the first seal into a first groove along the outer surface of the fitting.

13. The method of claim 12 further including positioning the second seal into a second groove along the outer surface of the fitting.

14. The method of claim 12 further including positioning a retainer at least partially into a second groove along the outer surface of the fitting.

15. The method of claim 14, wherein positioning the retainer includes positioning the retainer outside of the boss.

16. The method of claim 15, wherein positioning the retainer includes contacting the retainer to an exterior surface of the boss.

17. The method of claim 11 further including moving the fitting relative to the bore of the boss to a second position so that the first seal is positioned outside of the boss, the second seal is engaged between the inner and outer surfaces, and the first stop feature contacts the second stop feature.

18. The method of claim 17, wherein moving the fitting relative to the bore of the boss includes rotating the fitting to engage an internally threaded surface of the boss and an externally threaded surface of the fitting.

19. The method of claim 18 including engaging a non-circular recess on an exterior surface of the fitting to rotate the fitting.

20. The method of claim 17, wherein moving the fitting relative to the bore of the boss includes moving a retainer positioned on the fitting within the bore.

* * * * *